United States Patent [19]

Scalisi et al.

[11] Patent Number: 4,633,729
[45] Date of Patent: Jan. 6, 1987

[54] SHIFT RAIL I-SHAPED INTERLOCKING LUGS

[75] Inventors: Joseph M. Scalisi; Peter Bzowycky, both of Liverpool, N.Y.

[73] Assignee: Chrysler Motors, Highland Park, Mich.

[21] Appl. No.: 779,545

[22] Filed: Sep. 24, 1985

[51] Int. Cl.[4] ............................................. G05G 5/10
[52] U.S. Cl. ................................................... 74/477
[58] Field of Search ............................ 74/477, 483 PB

[56] References Cited

U.S. PATENT DOCUMENTS 1,537,584  5/1925  Carhart ................................. 74/477
3,104,558  9/1963  Herr, Jr. ................................ 74/477

FOREIGN PATENT DOCUMENTS 56-85124  7/1981  Japan ..................................... 74/477

Primary Examiner—Allan D. Herrmann
Attorney, Agent, or Firm—Edward P. Barthel

[57] ABSTRACT

A shift rail interlocking lug system for a manual transmission having a pair of outboard shift rails and a center shift rail disposed in a longitudinally extending parallel manner. A pair of identical I-shaped shift rail interlocking lugs are located in a mirror image manner with each lug positioned intermediate the center rail and its associated outboard rail. The lugs are adapted for conjoint movement in a transverse vertical plane to insure travel of only one rail at a time during the shifting operation. Each I-shaped lug is adapted to interengage the center rail and its associated outboard rail in a self-supporting encapsulating manner throughout the shifting sequence.

3 Claims, 9 Drawing Figures

4,633,729

SHIFT RAIL I-SHAPED INTERLOCKING LUGS

BACKGROUND OF THE INVENTION

This invention relates to manually operable change speed transmissions for motor vehicles and more particularly to a novel interlocking lug arrangement for the transmission shift rails.

In vehicles having manual change speed transmissions, wherein gears are shiftable by axially reciprocable shift rails, there is a need to prevent the shiftable gears from being accidentally moved out of their preselected positions. To prevent accidental shifting various types of interlock and detent mechanisms have been suggested. The U.S. Pat. Nos. 1,537,584 to Carhart and 3,104,558 to Herr, Jr. are examples of prior art interlock plate-like lug devices which hold a pair of sliding rails in neutral while a third rail is being shifted or is in gear. These mechanisms, however, have not been entirely satisfactory from the standpoint of reliability, simplicity of construction and cost of manufacture.

SUMMARY OF THE INVENTION

The present invention meets all the requirement of an interlocking system for a three shift rail manual transmission, but has decided advantages over the existing designs such as disclosed in the above-mentioned patents.

It is a feature of the invention that the pair of interlocking lugs are arranged in a symmetrical encapsulating manner with a pair of outboard shift rails and a center shift rail disposed parallel longitudinally extending relation. The lugs are generally I-shaped and each lug is adapted to selectively interengage one outboard shift rail and the center shift rail in an encapsulating self-supporting manner such that the transmission is restricted from being in more than one gear at a time. The interlocking lugs "hold" one transmission sliding clutch in neutral while the other sliding clutch is being shifted or is in gear.

It is another feature of the present invention to provide a pair of identical generally I-shaped interlocking lugs for a three shift rail manual transmission which are "sandwiched" between a pair of vertically disposed longitudinally spaced, parallel, flat surfaces. The flat surfaces, located in a bearing plate and transmission case, for example, require no exterior to interior machining operations and thus obviate close tolerance production problems.

Still another feature of the present invention is that the generally I-shaped interlocking symmetrical lugs eliminate special handling in assembly and are readily servicable.

A further advantage of the present invention is to provide a pair of identical generally I-shaped interlocking lugs for three shift rails which rails are arranged With their principal axis spaces in a symmetrical equally spaced manner on the arc of a circle and with the center rail axis positioned at the zenith of the arc such that identical shift forks may be used interchangeably on any one of the three shift rails.

DESCRIPTION OF THE DRAWINGS

These and other features and advantages of this invention will become readily apparent from a reading of the following description and a consideration of the detailed drawings wherein.

DESCRIPTION OF THE PREFERRED EMBODIMENT

Figure 1:
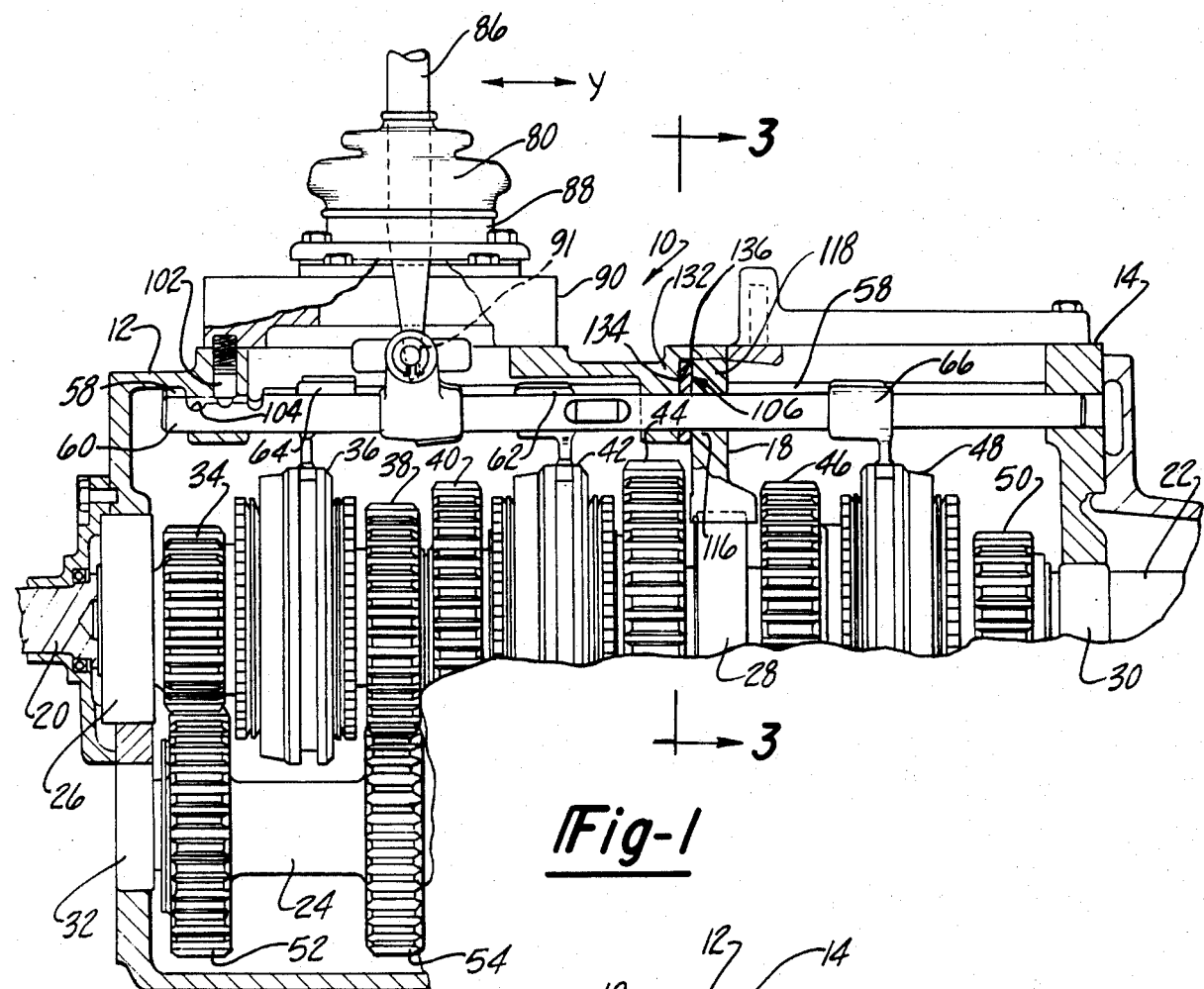
FIG. 1 is a longitudinal fragmentary side sectional view, partly in elevation, showing a transmission mechanism in which a shift interlock system according to the present invention is incorporated.

With reference to the drawings, FIG. 1 shows a portion of a manually operated transmission generally indicated at 10. The transmission includes a gear train of five forward movements and one reverse movement. The transmission has case means comprising a forward case portion 12 and an aft case portion 14 disposed in end to end relation suitably secured as by bolts 16 shown in FIG. 2. A vertically disposed transversely extending midship bearing plate 18 is shown supported at the juncture of the forward and aft case portions 12 and 14. The forward case portion 12 supports thereon an input shaft 20, an output shaft 22 and a counter shaft 24 comprising a gear train. The input and output shafts are located coaxially and journaled by suitable bearings 26, 28 and 30. The counter shaft 24 is located parallel to the input and output shafts and journaled by bearings such as front bearing 32.

The output shaft 20 is formed at its one end with a fourth-speed gear 34. A first sliding clutch synchronizer device 36 is positioned on the output shaft 22 intermediate the fourth-speed gear 34 and a third-speed gear 38. The third-speed gear 38 is located adjacent a second-speed gear 40. A second sliding clutch synchronizer device 42 is located intermediate the second-speed gear 40 and a first-speed gear 44. A reverse gear 46 is located adjacent the first-speed gear with output shaft bearing means 28 disposed therebetween. A third sliding clutch synchronizer device 48 is located intermediate the reverse gear 46 and a fifth-speed gear or overdrive gear 50. The counter shaft 24 has counter gears, only two of which are shown at 52 and 54, mounted thereon in meshing engagement with the five speed-gears 34, 38, 40, 44, and 50 and the reverse gear 46.

Figure 2:
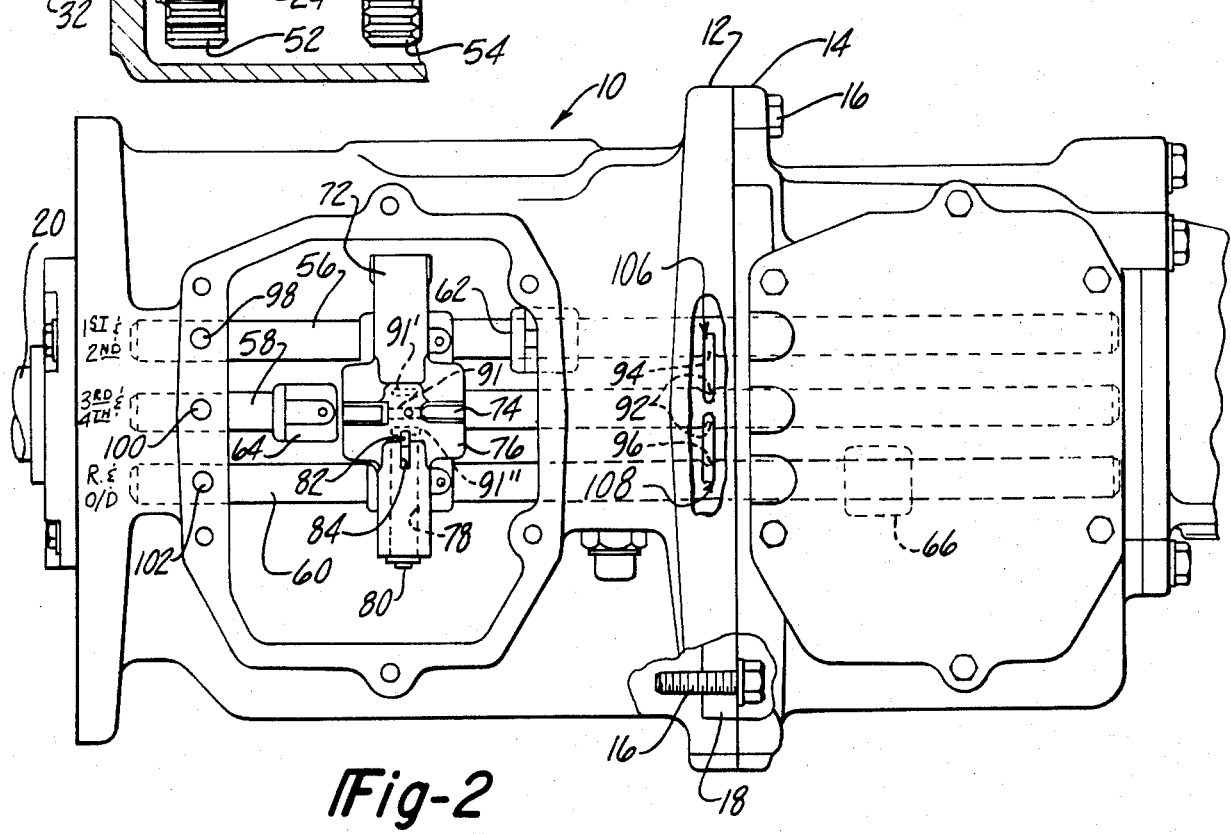
FIG. 2 is a top elevational fragmentary view, with parts broken away, of the transmission of FIG. 1.

FIGS. 1 and 2 show a shift control having three parallelly arranged, relatively shiftable, shift rods or rails 56, 58 and 60. The longitudinally extending shift rails are slidably supported in bores formed in the forward and aft case portions and the midship bearing plate 18. Each of the shift rails 56, 58 and 60 have pinned thereon identical shifter forks 62, 64 and 66, respectively. The forward fork 64 on rail 58 is engaged with the shiftable third and fourth speed gear synchronizer device 36, while the fork 62 on rail 56 is engaged with the shiftable synchronizer device 42. The rearmost fork 66 is engaged with the shiftable synchronizer device 48.

Figure 7:
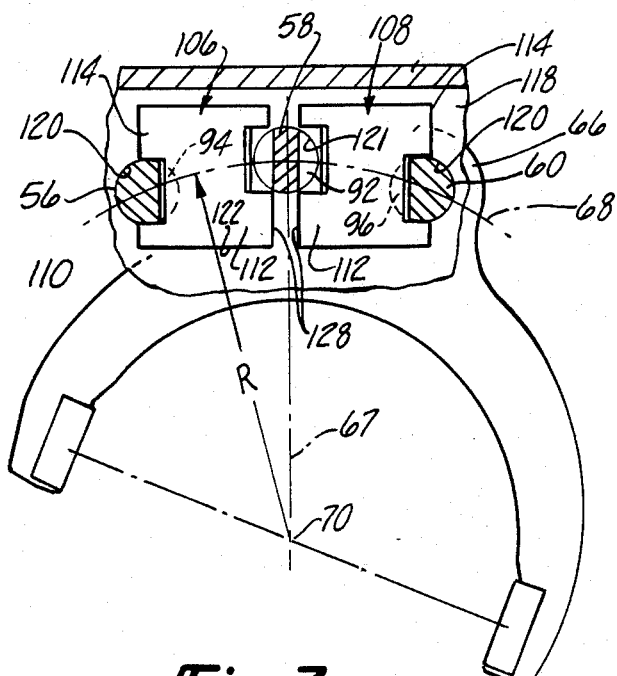
FIG. 7 is an enlarged fragmentary sectional view showing the shift rails in their third/fourth speed positions together with the rear most fork.
Figure 8:
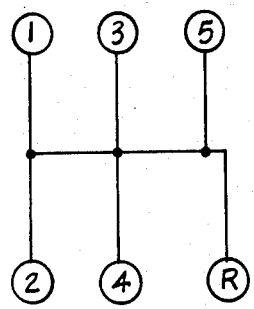
FIG. 8 is a diagrammatic outline depicting the shift pattern through which the shift lever of FIG. 1 may be moved.

The shift rails, mounted for axial sliding reciprocal movement, are disposed in a symmetrical arcuate arrangement. Thus, the center rail 58 has its principal axis aligned in a vertically extending longitudinal plane of symmetry indicated by construction line 67. As seen in FIG. 7 the centers of the shift rails are arranged on the arc of a circle shown in phantom at 68 having a radius "R" with its center shown at 70. Each rail 56, 58 and 60 is shiftable axially in opposite fore and aft directions from a neutral position to select either one of two alternate gears of the transmission. The rail 56 carries a first/second speed gear selector lug 72, the rail 58 carries a third/fourth speed gear selector lug 74, and the rail 60 carries a reverse/fifth speed gear selector lug 76. As seen in FIG. 2 the selector lug 76 has a transverse bore 78 in which is arranged a spring loaded plunger 80. The plunger includes a guide detent 82 on its inner end which travels in a guide slot 84 on the lug 76.

FIG. 1 shows a speed change lever 86 having an intermediate spherical portion (not shown) engagably supported by means of a spring in a spherical seat provided in an upper collar 88 bolted on upper housing block 90. As seen in FIG. 1 the lower end of the speed change lever 86 terminates in a depending finger 91. The finger 91 normally is aligned on a vertical axis for engagement with a notch in the lug 74 as shown in phantom in FIG. 2. The plunger 80 can be tilted about the spherical seat when the speed change lever 86 is moved in a longitudinal direction indicated by the arrow Y. The finger 91 can also be tilted a second transverse direction, at a right angle to the arrow Y when the speed change lever is moved in the second direction. The finger 91 may thus occupy either of two transverse positions relative to the central position engaging lug 74. In its dashed line position 91' of FIG. 2, the finger engages a notch in the lug 72 and on it dashed line position 91" the finger engages the lug 76 after depressing the plunger 80 to an outward position.

The mode of selecting the speed-gear rail is changed by rocking the lever 86 in the transverse direction, i.e., at a right angle to the arrow Y. The mode of meshing each set of speed change gears 34–38, 40–44 or 46–50 is changed by rocking the lever 86 in a longitudinal direction indicated by the arrow Y.

The shift rail interlock system of the present invention will now be described. The interlock system is a safeguard to prevent the transmission from being in more than one speed-gear at a time. That is, the locking system "holds" two of the three sliding clutches 36, 42 and 48 in neutral while the remaining sliding clutch is being shifted or is in gear. As seen in FIGS. 2 and 7, the middle rail 58 has a pair of opposed shallow V-shaped notches or recesses 92 formed therein. Each of the side rails 56 and 60 have a single V-shaped notch or recess 94 and 96, respectively each formed therein to face in opposed outboard directions.

In the neutral position of FIG. 2 all the recesses 92, 94 and 96 are aligned in a common transverse plane. The three shift rails are located by spring loaded plungers 98, 100 and 102. In their neutral conditions shown in FIGS. 1 and 2, each plunger is engaged with its associated intermediate groove of a set of three aligned grooves formed in each rail. For example, in FIG. 1, plunger 102 is engaged with the neutral groove of its set of shift rail grooves 104.

As best seen in FIGS. 3–6 the locking lugs of the present invention are shown in the form of two mirror image first and second plate-like lugs indicated generally at 106 and 108. As the lugs 106 and 108 are identical the same numbers will be used to describe the same or corresponding parts. The lugs are generally I-shaped wherein each lug having a vertically disposed body portion 110 with a lower inboard or inwardly extending toe portion 112 and a lower outboard or outwardly extending toe portion 113. The lugs each have an upper outboard or outwardly extending toe portion 114 and an upper inboard or inwardly extending toe portion 115.

The plate 18 has an upstanding guide flange 118 formed with three equally spaced bores or holes having their centers symmetrically aligned on an arc 68 of the predetermined radius R (FIG. 7). The outboard bores 120 have their centers arranged in a common horizontal plane while the central bore 121 has its center located a determined distance above the centers of the outboard bores 120. Each bore is sized to slidably receive its associated longitudinally extending rail 56, 58 or 60 for reciprocal travel therein. It will be noted that the center 70 of the arc 68 coincides with the principal axis of the output shaft 22.

Figure 4:
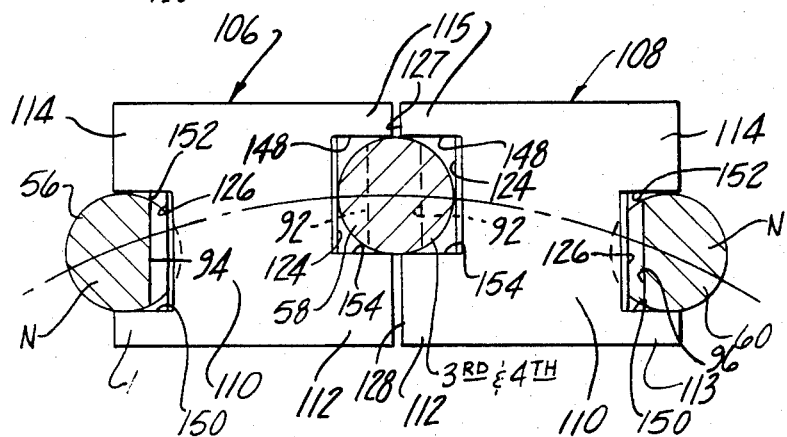
FIG. 4 is a view similar to FIG. 3 with the other outboard rail shown in a shifted position.

FIGS. 4 and 7 show the locking lugs 106 and 108 in their neutral position of FIG. 2 wherein the recesses 92, 94 and 96 of the shift rails are aligned in a common transverse plane. The first lug 106 is shown shifted outboard from center rail 58 such that its inboard vertical edge 124 clears its associated center rail recess 92. In this mode the first lug 106 has its outboard vertical edge 126 in engagement with the recess 94 of the rail 56. In a corresponding manner, the second lug 108 is shown shifted outboard from center rail 58 such that its inboard vertical edge 124 clears its associated center rail recess 92 while its outboard vertical edge 126 is in engagement with recess 96 of outboard rail 60. In this FIGS. 4 and 7 mode the third/fourth speed-gear center rail 58 is free to be moved longitudinally by the shift lever 86.

Figure 3:
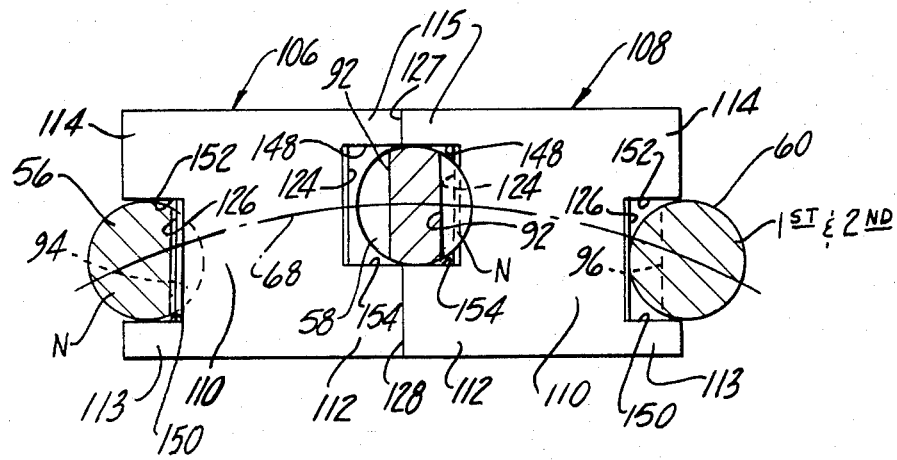
FIG. 3 is an enlarged fragmentary sectional view, taken substantially on the line 3—3 of FIG. 1, of I-shaped locking lugs with one outboard rail shown in a shifted position.
Figure 9:
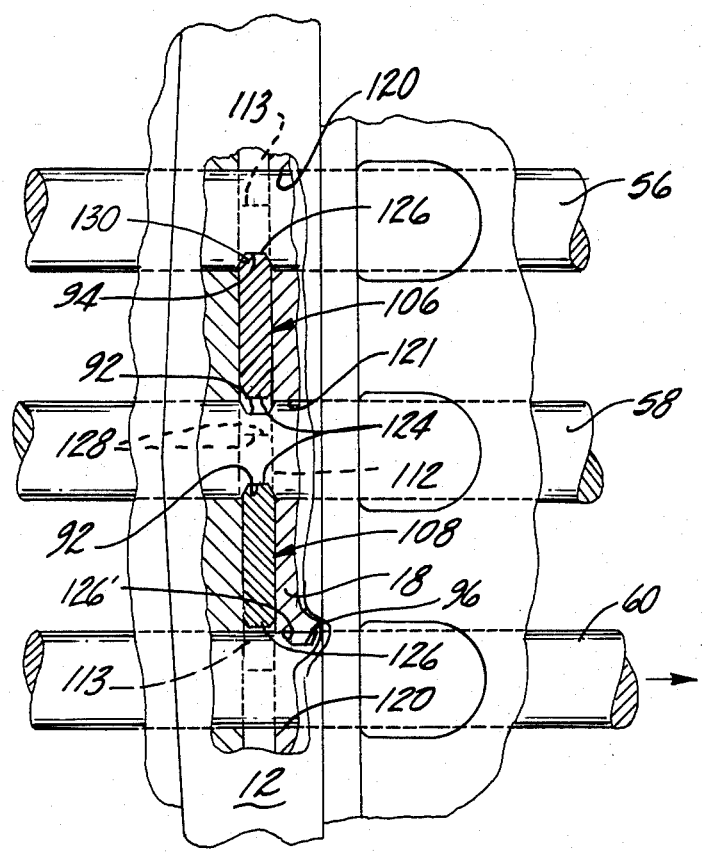
FIG. 9 is an enlarged fragmentary top elevational view of FIG. 3 with parts broken away and parts in section, showing outboard shift rail 60 shifted in an aft direction.

FIG. 3 shows the interlocking lugs 106 and 108 in their outboard rail 56 and center rail 58 locked positions wherein rail 60 has been shifted in an aft direction. Upon the outboard rail 60 being shifted a chamferred cam edge 126' shown in FIG. 9 of its recess 96 moves the second lug 108 leftwardly such that its vertical edge 124 is placed into locking engagement with its associated center rail recess 92. Further, the second lug 108 inboard upper and lower toe vertical edges 127, 128 respectively are shifted leftwardly into abutting contact with the first lug 106 opposed upper and lower toe vertical edge 127 and 128 forcing lug 106 vertical edge 126 into recess 94 of outboard rail 56. Also vertical edge 124 of lug 108 moves leftward into its associated recess 92 of center rail 58, thereby locking the rails 56 and 58 in their neutral positions.

Figure 5:
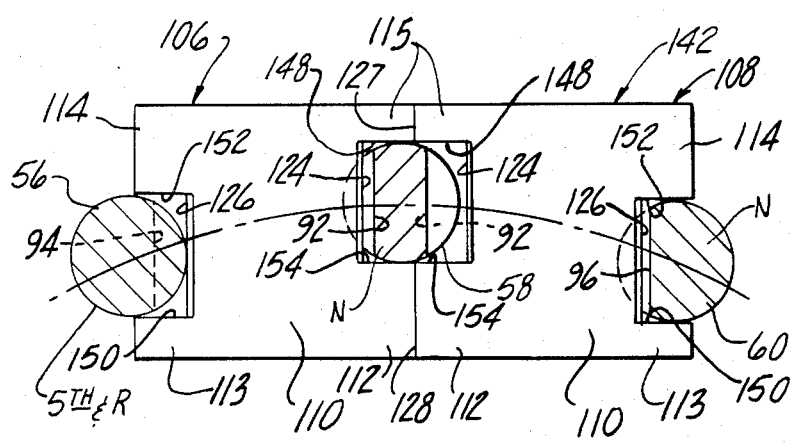
FIG. 5 is a view similar to FIG. 3 with the center rail shown in a shifted position.
Figure 6:
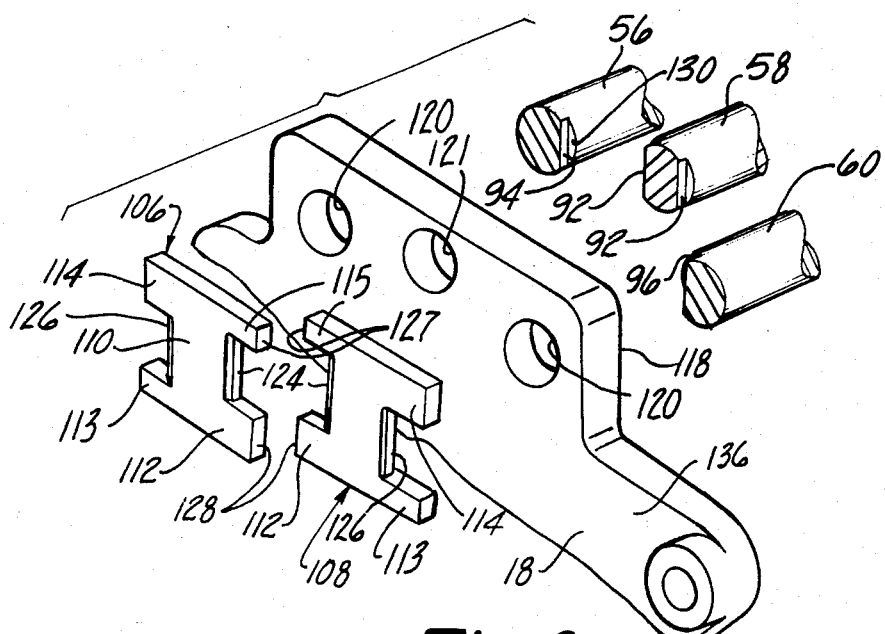
FIG. 6 is an exploded fragmentary view of the shift rails and I-shaped locking lugs of the invention.

FIG. 5 shows the interlocking lugs 106 and 108 in their center rail 58 and outboard rail 60 locked positions wherein rail 56 has been shifted by lever 86 in an aft direction. As a result of rail 56 being shifted a chamferred edge 130 of its recess 94 moves the first lug 106 rightwardly inboard such that its vertical edge 124 is placed into locked engagement with its associated center rail recess 92. Further, by virtue of lug 106 inboard upper and lower toe vertical edges 127 and 128 being in abutment with the lug 108 opposed inboard upper and lower edges 127 and 128, the lug 108 is shifted rightwardly wherein its outboard vertical edge 126 is moved into locking engagement with the recess 96 of outboard rail 60.

It will be seen in FIG. 1 that case portion cross member 132 has a rearwardly facing, vertically disposed, transverse surface 134. The bearing plate guide flange 118 has an opposed, forwardly facing, vertically disposed, transverse surface 136 spaced a determined axial distance from the cross member surface 134 defining a transverse guide slot 137. The axial distance between the parallel surfaces 134 and 136 is slightly larger than the thickness of the lugs 106 and 108, allowing ready insertion and removal of the lugs from the guide slot 137. The opposed parallel slot surfaces 134 and 136 maintain the lugs 106 and 108 in a vertical orientation throughout their transverse shifting. However, it will be appreciated that the axial spacing of the surfaces 134 and 136 is not critical. Thus, the surfaces are formed as nominally flat surfaces without machining, i.e., chipless manufacture requiring no exterior to interior machining operation.

Applicants' unique I-shaped interlocking lugs are each self-supportingly retained on the center shift rail 58 and an associated outboard rail 56 or 60. Each I-shaped lug has its lower 113 and upper 114 outboard toe portion defining horizontally extending upwardly facing and downward facing edges 150 and 152, respectively. The lug 106 has its upwardly facing edge 150 disposed in juxtaposed tangent relation to the lower periphery of the outboard rail 56. In a like manner, lug 106 has it downwardly facing edge 152 disposed in juxtaposed tangent relation to the upper periphery of the outboard rail 56.

Further, each I-shaped lug has its lower 112 and upper 114 inboard toe portion defining horizontally extending upwardly facing and downwardly facing edges 150 and 148, respectively. Thus, the lug 106 has its upwardly facing edge 154 disposed in juxtaposed tangent relation to the lower periphery of the center rail 58 while the downwardly facing edge 148 is disposed in juxtaposed tangent relation to the upper periphery of the center rail 58. The above described relationship applies in a corresponding manner between lug 108, center rail 56 and outboard rail 60.

By virtue of this structural arrangement each lug interenages a pair of adjacent shift rails in an encapsulating arrangement allowing the lugs to ride on the shift rails in a self-supporting manner. The parallel opposed surfaces 134 and 136 are longitudinally spaced on either side of the lugs to limit the fore and aft movement of the lugs during their transverse shifting sequences. It will thus be appreciated that the surfaces 134 and 136 are spaced a sufficient longitudinal distance greater than the thickness of the lugs to allow for limited axial play between the opposed surfaces 134 and 136 while maintaining the lugs in substantially coplanar relation.

It will be noted that in the present embodiment the lugs 106 and 108 have their body portion inwardly facing vertical edges 124 offset vertically upwardly a predetermined distance to engage their associated center rail recesses 92. In a like manner the lugs 106 and 108 have their body portion outwardly facing vertical edges 126 offset vertically downwardly a predetermined distance to engage their associated outboard recesses 44 and 96. It will be appreciated that applicants' lugs may be employed in manual transmissions having other shift rail configurations. As an example, the shift rails 56, 58 and 60 could have their principal axis oriented in a common horizontal plane. In such a shift rail coplanar arrangement each of the I-shaped lugs could be formed with a true I-shape configuration. That is the lug vertical edges 124 and 126 would not be upwardly and downwardly offset but located equidistant from the upper and lower edges of the lugs.

What is claimed is:

1. An interlocking mechanism for a pair of first and second outboard shift rails and a center shift rail wherein the rails extending longitudinally of a change speed gear transmission, said transmission including case means having a transverse vertically extending support flange formed with three equal diameter bores arranged in an equally spaced symmetrical manner with respect to a longitudinally extending vertically disposed plane, said three bores defining a central bore and a pair of outboard bores, each said rail sized to extend through an associated one of said bores for reciprocal axial travel therein, said interlocking mechanism comprising:

a pair of first and second plate-like, I-shaped identical interlocking lugs;

each lug of said pair of lugs arranged in a mirror-image manner on either side of said center shift rail for horizontal movement in a transverse vertical plane;

each said I-shaped lug comprising a vertically disposed rectangularly shaped body portion having inwardly and outwardly facing vertical edges, each said I-shaped lug formed with an inwardly and an outwardly extending toe portion on its upper end and with an inwardly and an outwardly extending toe portion on its lower end, each said inwardly extending toe portion terminating in a vertical disposed inwardly facing edge;

said first lug body portion disposed intermediate said center rail and said first outboard rail such that its upper inwardly extending toe portion is positioned above said center rail and its upper outwardly extending toe portion is positioned above said first outboard rail, said upper inwardly and outwardly extending toe portions each having a horizontally disposed downwardly facing edge located juxtaposed the upper periphery of said center rail and said first outboard rail, respectively;

said first lug lower inwardly extending toe portion positioned below said center rail, said first lug lower outwardly extending toe portion positioned below said first outboard rail, said first lug lower inwardly and outwardly extending toe portions each having a horizontally disposed upwardly facing edge located juxtaposed the lower periphery of said center rail and said first outboard rail, respectively;

said second lug upper inwardly and outwardly extending toe portions and lower inwardly and outwardly extending toe portions being disposed in an identical mirror-image manner as said first lug toe portions relative to said center rail and said second outboard rail;

each said outboard rail having an inwardly facing recess and said center rail having a pair of opposed outwardly facing recesses;

whereby with said rails positioned in one mode wherein their associated recesses are disposed in a common transverse plane, each said first and second lug having its body portion outwardly facing vertical edge in locking engagement with its associated outboard rail recess, and each said first and second lug having its body portion inwardly facing vertical edge located closely adjacent said center rail;

whereby upon said first outboard rail being shifted axially its recess being operative to cam said first lug a predetermined distance inwardly toward said center rail causing its body portion inwardly facing vertical edge to be moved into locking engagement with its associated center rail recess, and whereby said first lug upper and lower inwardly extending toe portions vertical edges contacting said second lug upper and lower inwardly extending toe portions vertical edges causing said second lug body portion outwardly facing vertical edge to be moved into locking engagement with said second outboard rail recess;

and whereby upon said second outboard rail being shifted axially its recess being operative to cam said second lug toward said center rail causing said second lug body portion inwardly facing vertical edge to be moved into locking engagement with its associated center rail recess, and whereby said second lug upper and lower inwardly extending toe portions vertical edges contacting said first lug upper and lower inwardly extending toe portions vertical edges causing said first lug body portion outwardly facing vertical edge to be moved into locking engagement with said first outboard rail recess.

2. An interlocking mechanism for a pair of first and second outboard shift rails and a center shift rail wherein the rails extending longitudinally of a change speed gear transmission, said transmission including case means having a transverse vertically extending support flange formed with three equal diameter bores arranged in an equally spaced symmetrical manner with respect to a longitudinally extending vertically disposed plane, said three bores having their centers aligned on a circular arc defining a central bore and a pair of outboard bores, said central bore having its center located above the centers of said pair of outboard bores, each said rail sized to extend through an associated one of said bores for reciprocal axial travel therein, said interlocking mechanism comprising:

a pair of first and second plate-like, I-shaped identical interlocking lugs;

each lug of said pair of lugs arranged in a mirror-image manner on either side of said center shift rail for horizontal movement in a transverse vertical plane;

each said I-shaped lug comprising a vertically disposed rectangularly shaped body portion having inwardly and outward facing vertical edges, each said I-shaped lug formed with an inwardly and an outwardly extending toe portion on its upper end and with an inwardly and an outwardly extending toe portion on its lower end, each said inwardly extending toe portion terminating in a vertically disposed inwardly facing edge;

said first lug body portion disposed intermediate said center rail and said first outboard rail such that its upper inwardly extending toe portion positioned above said center rail and its upper outwardly extending toe portion is positioned above said first outboard rail, said upper inwardly and outwardly extending toe portions each having a horizontally disposed downwardly facing edge located juxtaposed the upper periphery of said center rail and said first outboard rail, respectively;

said first lug lower inwardly extending toe portion positioned below said center rail, said first lug lower outwardly extending toe portion positioned below said first outboard rail, said first lug lower inwardly and outwardly extending toe portions each having a horizontally disposed upper edge located juxtaposed the lower periphery of said center rail and said first outboard rail, respectively;

said second lug upper inwardly and outwardly extending toe portions and lower inwardly and outwardly extending toe portions being disposed in an identical mirror-image manner as said first lug toe portions relative to said center rail and said second outboard rail;

each said outboard rail having an inboard facing recess and said center rail having a pair of opposed outboard facing recesses;

whereby with said rails positioned in one mode their associated recesses are disposed in a common transverse plane, each said first and second lug having its body portion outboard vertical edge in locking engagement with its associated outboard rail recess, and each said first and second lug having its body portion inwardly facing vertical edge spaced from said center rail;

whereby upon said first outboard rail being shifted axially its recess being operative to cam said first lug a predetermined distance toward said center rail causing its body portion inwardly facing vertical edge to be moved into locking engagement with its associated center rail recess, and whereby said first lug upper and lower inwardly extending toe portions vertical edges contacting said second lug upper and lower inwardly extending toe portions vertical edges causing said second lug body portion outwardly facing vertical edge to be moved into locking engagement with said second outboard rail recess;

and whereby upon said second outboard rail being shifted axially its recess being operative to cam said second lug toward said center rail causing the second lug body portion inwardly facing edge to be moved into locking engagement with its associated center rail recess, and whereby said second lug upper and lower inwardly extending toe portions vertical edges contacting said first lug upper and lower inwardly extending toe portions vertical edges causing said first lug body portion outwardly facing vertical edge to be moved into locking engagement with said first outboard rail recess.

3. The interlocking mechanism as set forth in claim 2 wherein, said first and second lug body portions inwardly facing vertical edges are offset vertically upwardly to engage said center rail recess, and said first and second lug body portion outwardly facing vertical edges are offset vertically downwardly to engage their associated outboard rail recesses.

* * * * *